US009241067B2

(12) United States Patent
Clark

(10) Patent No.: US 9,241,067 B2
(45) Date of Patent: Jan. 19, 2016

(54) SYSTEM AND METHOD FOR SELF-SERVICE CALLBACK MODIFICATION

(71) Applicant: Interactive Intelligence, Inc., Indianapolis, IN (US)

(72) Inventor: John R. Clark, Zionsville, IN (US)

(73) Assignee: INTERACTIVE INTELLIGENCE GROUP, INC., Indianapolis, IN (US)

( * ) Notice: Subject to any disclaimer, the term of this patent is extended or adjusted under 35 U.S.C. 154(b) by 145 days.

(21) Appl. No.: 13/741,666

(22) Filed: Jan. 15, 2013

(65) Prior Publication Data

US 2014/0198905 A1  Jul. 17, 2014

(51) Int. Cl.
*H04M 3/42* (2006.01)
*H04M 3/523* (2006.01)

(52) U.S. Cl.
CPC ........ *H04M 3/42195* (2013.01); *H04M 3/5231* (2013.01)

(58) Field of Classification Search
CPC ............................ H04M 3/48; H04M 3/42195
USPC ........................................ 379/210.01, 265.01
See application file for complete search history.

(56) References Cited

U.S. PATENT DOCUMENTS

| 5,579,382 | A | * | 11/1996 | Tsukishima | 379/210.01 |
| 6,771,760 | B1 | * | 8/2004 | Vortman et al. | 379/209.01 |
| 7,050,986 | B1 | * | 5/2006 | Vance et al. | 705/5 |
| 2007/0088701 | A1 | | 4/2007 | Rao | |
| 2007/0201659 | A1 | * | 8/2007 | Altberg et al. | 379/201.01 |
| 2009/0285385 | A1 | * | 11/2009 | Dunbar et al. | 379/266.01 |
| 2012/0039451 | A1 | * | 2/2012 | Shaffer et al. | 379/142.1 |
| 2012/0084351 | A1 | * | 4/2012 | Yato et al. | 709/203 |
| 2012/0238239 | A1 | * | 9/2012 | Schroeder et al. | 455/405 |
| 2012/0246081 | A1 | * | 9/2012 | Brown et al. | 705/304 |
| 2012/0263293 | A1 | * | 10/2012 | Vasquez et al. | 379/265.12 |

FOREIGN PATENT DOCUMENTS

EP       1278358 A1 *  1/2003  ............ H04M 11/02
WO   WO 2008/008653 A2 *  1/2008

OTHER PUBLICATIONS

International Search Report and Written Opinion in PCT/US2013/021540 mailed Mar. 25, 2013.

* cited by examiner

*Primary Examiner* — Oleg Asanbayev

(57) ABSTRACT

A system and method are presented for self-service callback modification. A user may request a callback. A unique confirmation identifier may be issued which may be used by the system to look up the callback record. A user may modify their callback request at any time during the callback process to receive their callback at a requested point in time, change the address to which the callback is addressed, alter the media through which the callback is placed, etc. Modification may occur in real time. Confirmation may be sent to the user after modification.

8 Claims, 4 Drawing Sheets

300

SYSTEM AND METHOD FOR SELF-SERVICE CALLBACK MODIFICATION

BACKGROUND

The presently disclosed embodiments generally relate to telecommunications systems and methods. More particularly, the presently disclosed embodiments pertain to callbacks from a telecommunication system.

SUMMARY

A system and method are presented for self-service callback modification. In at least one embodiment, a unique confirmation identifier may be issued which may be used by the system to look up the callback record. A user may modify their callback request at any time during the callback process to receive their callback at a requested point in time, change the address to which the callback is addressed, alter the media through which the callback is placed, etc. Modification may occur in real time. Confirmation is sent to the user after modification.

In one embodiment, a computer-implemented method of self-service callbacks is disclosed, comprising the steps of: a) presenting an identifier of a callback request; b) performing a callback lookup according to said identifier; c) performing modification of a callback; d) determining if said modification of a callback is successful; and e) sending a successful confirmation identifier if said modification of said callback is successful.

In another embodiment, a system for self-service callbacks is disclosed, comprising: a) means for presenting an identifier of a callback request; b) means for performing a callback lookup according to said identifier; c) means for performing modification of a callback; d) means for determining if said modification of a callback is successful; and e) means for sending a successful confirmation identifier if said modification of said callback is successful.

DETAILED DESCRIPTION

Figure 1:
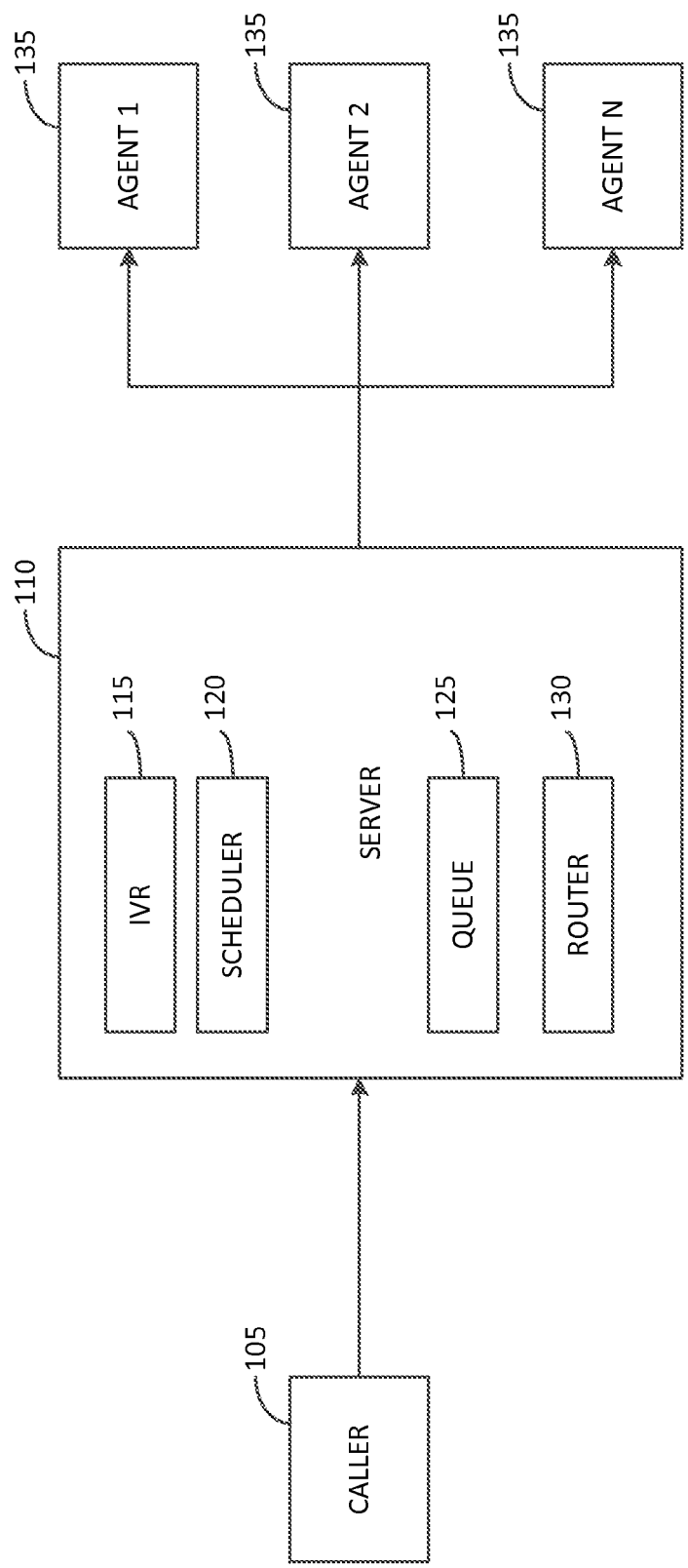
FIG. 1 is a diagram illustrating the basic components of one embodiment of a customer service based callback system.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In a simple callback, a caller (or user) may place a call to speak with an unavailable party and a message is taken by another person. The unavailable party may return the call at a future time. In an example where the callback process is automated, the caller may leave a message with a machine which allows the caller to record a message. The caller has the opportunity to state information, such as a specific reason for the call and their contact details.

In other callback scenarios, for example, a company could offer for-fee voicemail services which offer additional capabilities such as busy line transfer and ring-no answer diversion. These services could allow business the opportunity to provide callback services during peak times when all lines were in use, or when not all lines could be answered by a live customer service representative, or agent. Using voicemail alone, the expected wait time and the reliability of receiving the callback could vary widely.

Progression into the digital era allows for a richer customer experience with the Internet, computers, and mobile devices, for example. Customer service capabilities also increased. For example, callers can select through interactive voice response (IVR) menus a call purpose. On-hold times can be predicted and reported to a caller. With this information, a caller could opt to wait on hold or to provide callback information. The choice to be called back could also be forced upon a caller after a certain wait time or predicted wait time.

The same principles apply to other media types, such as text chat, e-mail, and video, to name a few examples. The "callback" term is used in the industry to equally apply to different media types. Callback functionality, with regards to e-mail, may generally be implied but can be enhanced by a response email letting the user know the request was received and predictions of when it will be handled.

FIG. 1 is a diagram illustrating the basic components of one embodiment of a customer service based callback system, indicated generally at 100. The basic components of a customer service based callback system 100 may include: a caller 105; a server 110, which may include an Interactive Voice Response (IVR) module 115, a scheduler 120, a queue 125, and a router 130; and at least one agent 135.

A caller 105, or a user, may be a human calling into the system wishing to speak with a customer service representative, or an agent 135. The caller 105 may be unable to reach an agent 135 due to various factors, such as a high call volume or long wait times. The caller 105 has the option to request a callback for a later time in order to avoid interactively waiting for an agent 135 to become available. While several agents are shown for illustrative purposes, any number of agents may be utilized.

A server 110 may contain software, such as a call center software suite that is used in the operation of a call center, for example. The server 110 may house capabilities such as an IVR module 115, a scheduler 120, a queue 125, and a router 130. The IVR module 115 may interact with the caller when the caller dials into the computer. For example, when a caller dials into an IVR, they might receive a message such as "press 1 for checking, press 2 for savings". The scheduler 120 provides the ability for a user to select a specific point in time to receive a callback, such as after work hours or during a break. The scheduler 120 may be programmed to avoid callbacks during certain times, such as hours where a call center may be closed, for example. The scheduler 120 may also consider current wait times to introduce the interaction into the processing queue to most closely meet the desired callback time selected by a caller 105. For example, if a caller 105 wants to receive a callback at 6:00 pm and the current hold time is currently running 30 minutes, the callback will need to be presented for processing at 5:30 pm. Additional factors may be taken into consideration such as shift change times, for example. The queue 125 may be the waiting block where callers are placed in line in an on-hold condition. The wait queue block may conceptualize the time an interaction is connected to the system but the caller is still waiting to speak to an agent. The router 130 may route calls to agents 135. Routing may be performed based on skills, such as language, job description, proficiency, etc.

Figure 2:
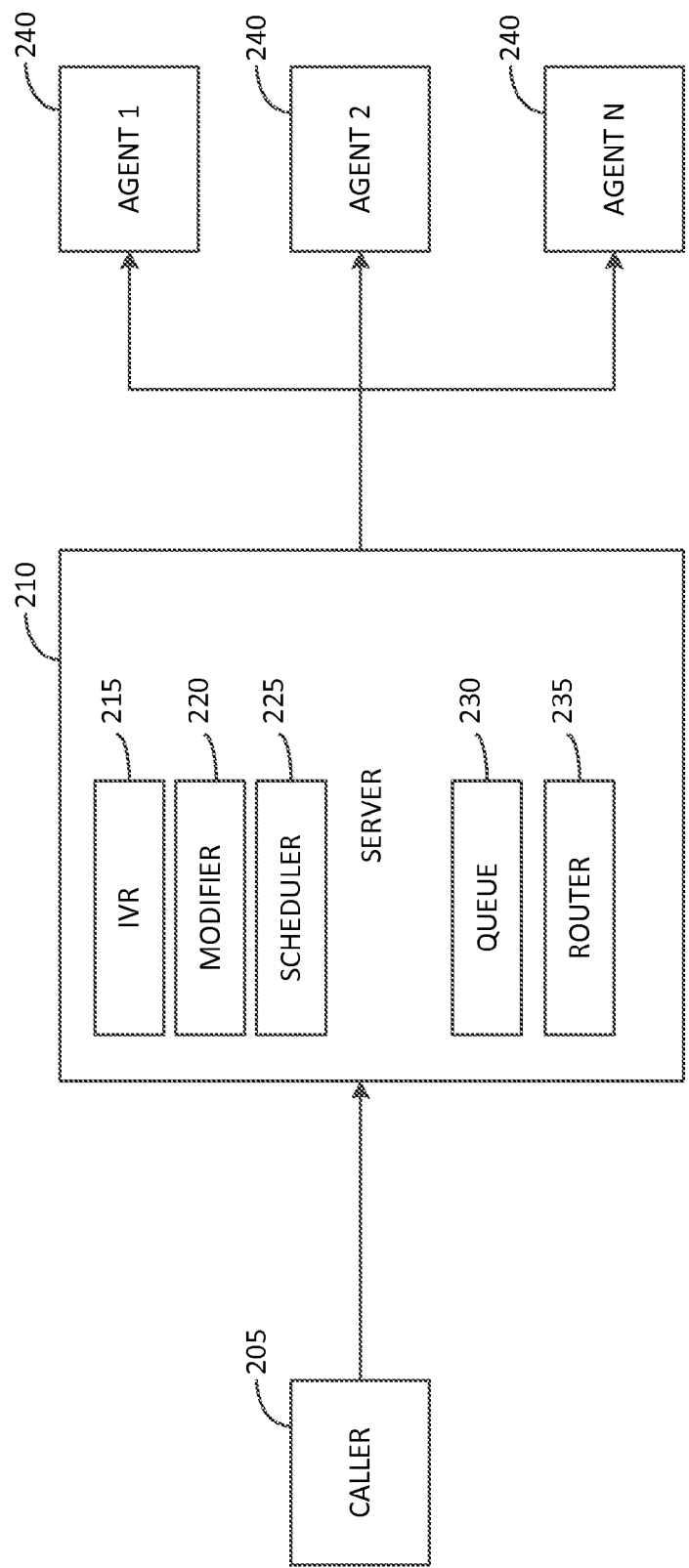
FIG. 2 is a diagram illustrating the components of a modified embodiment of a customer service based callback system.

FIG. 2 is a diagram illustrating the components of a modified embodiment of a customer service based callback system, indicated generally at 200. The basic components of a modified customer service based callback system 200 may include: a caller 205; a server 210, which may include an IVR module 215, a modifier 220, a scheduler 225, a queue 230, and a router 235; and at least one agent 240.

A caller 205, or a user, may be a human calling into the system wishing to speak with a customer service representative, or an agent 240. The caller 205 may be unable to reach a representative due to various factors, such as a high call volume or long wait times. The caller 205 has the option to request a callback for a later time in order to avoid interactively waiting for an agent 240 to become available. While several agents are shown for illustrative purposes, any number of agents may be utilized.

A server 210 may contain software, such as a call center software suite that is used in the operation of a call center, for example. The server 210 may house capabilities such as an IVR module 215, a modifier 220, a scheduler 225, a queue 230, and a router 235. The IVR module 215 may interact with the caller when the caller dials into the computer. For example, when a caller dials into an IVR, they might receive a message such as "press 1 for checking, press 2 for savings". The modifier 220 may allow modification of a callback by the user or the system. Such modification may include modification of time, skill, media, and/or address, all of which are described in greater detail as follows. The scheduler 225 provides the ability for a user to select a specific point in time to receive a callback, such as after work hours or during a break. The scheduler 225 may be programmed to avoid callbacks during certain times, such as hours where a call center may be closed. The scheduler 225 may also consider current wait times to introduce the interaction into the processing queue to most closely meet the desired callback time selected by a caller 205. For example, if a caller 205 wants to receive a callback at 6:00 pm and the current hold time is currently running 30 minutes, the callback will need to be presented for processing at 5:30 pm. Additional factors may also be taken into consideration such as shift change times, for example. The queue 230 may be the waiting block where callers are placed in line in an on-hold condition. The wait queue block may conceptualize the time an interaction is connected to the system but the caller is still waiting to speak to an agent. The router 235 may route calls to agents 240. Routing may be performed based on skills, such as language, job description, proficiency, etc.

Figure 3:
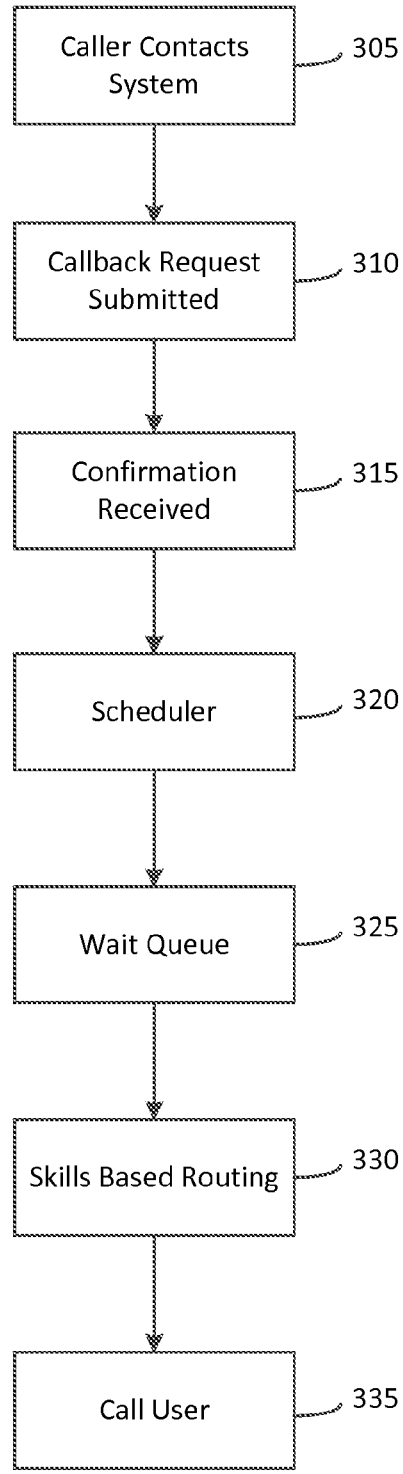
FIG. 3 is a flowchart illustrating one embodiment of a process for a customer service based callback.

FIG. 3 is a flowchart illustrating one embodiment of a process for a customer service based callback. The process 300 may be operative on any or all elements of the system 100 (FIG. 1).

A user calls into the system in step 305. For example, a caller may dial a number wishing to speak with a customer service representative or an agent about a product issue. Control is passed to operation 310 and the process 300 continues.

In operation 310, a callback is requested. For example, a callback may be requested if no agents are available. In selecting a callback, a user may select an option from the telephony user interface, or the IVR, requesting a callback. In at least one embodiment, an expert system may recognize the need to automatically encourage or force a callback. Automation may occur when call volume is unusually high, wait time is long, or a variety of other factors are present that may be determined to reduce wait times or toll fees. A user may request a callback at a later time to avoid interactively waiting for an agent to become available. This may be important to the user if they are on a mobile device where battery life is limited, or in any number of exemplary situations. Control is passed to operation 315 and the process 300 continues.

In operation 315, confirmation of the callback request is received. For example, after processing the scheduling of the callback request, the details of the callback may be presented to the customer. Scheduled callbacks may be planned that allow the user to choose a point in time that works best for them to receive the callback as opposed to first-come-first serve call processing. An example of selecting a point in time may include after work hours, during a break, or some other range describing the best time to call. A request may be combined with multiple phone numbers, such as a "daytime" phone number and an "evening" phone number. Control is passed to operation 320 and the process 300 continues.

In operation 320, the scheduler provides the caller with options to receive a callback. For example, the scheduler may allow the user to determine a specific point in time to receive a callback such as after work hours or during a break. Control is passed to operation 325 and the process 300 continues.

In operation 325, the callback request is placed into a wait queue for processing when an agent becomes available or a desired permissible scheduled callback time arrives. For example, the wait queue block may conceptualize the time a user would ordinarily wait to speak with an agent. Control is passed to operation 330 and the process 300 continues.

In operation 330, the callback object is routed. Routing may be based on skill. For example, the term skill may refer to the best possible destination to route a callback. A skill may be a specific spoken language or a capability at the agent's workstation, such as a video camera. A callback request may include specific skill requirements. For example, if a user chose to be called back about a widget part, this skill is relevant to the agent who calls the user back. Other parameters of the call may be referred to as skills, such as the ability to call back after business hours and the ability to text chat in a particular language. Some requests may require more than one particular skill. The ability to text chat in a particular language may require the two skills of text chatting proficiently and specific language proficiency. Text chat may include the ability of the agent to be proficient in keyboarding skills. Text chat may also include the ability of the agent to type due to specific software required at the agent workstation. Once a calculation has been made for routing, the call may be routed to the most appropriate agent(s). Control is passed to operation 335 and the process 300 continues.

In operation 335, the user is called and the process ends. For example, the user may be contacted by the requested means, such as via text chat. Contact may include video calls, text chats, a telephone call, or whichever means the user selected to be contacted by. If the user is unable to be reached, a variety of retry heuristics may be employed, such as leaving a message and/or trying again later.

Figure 4:
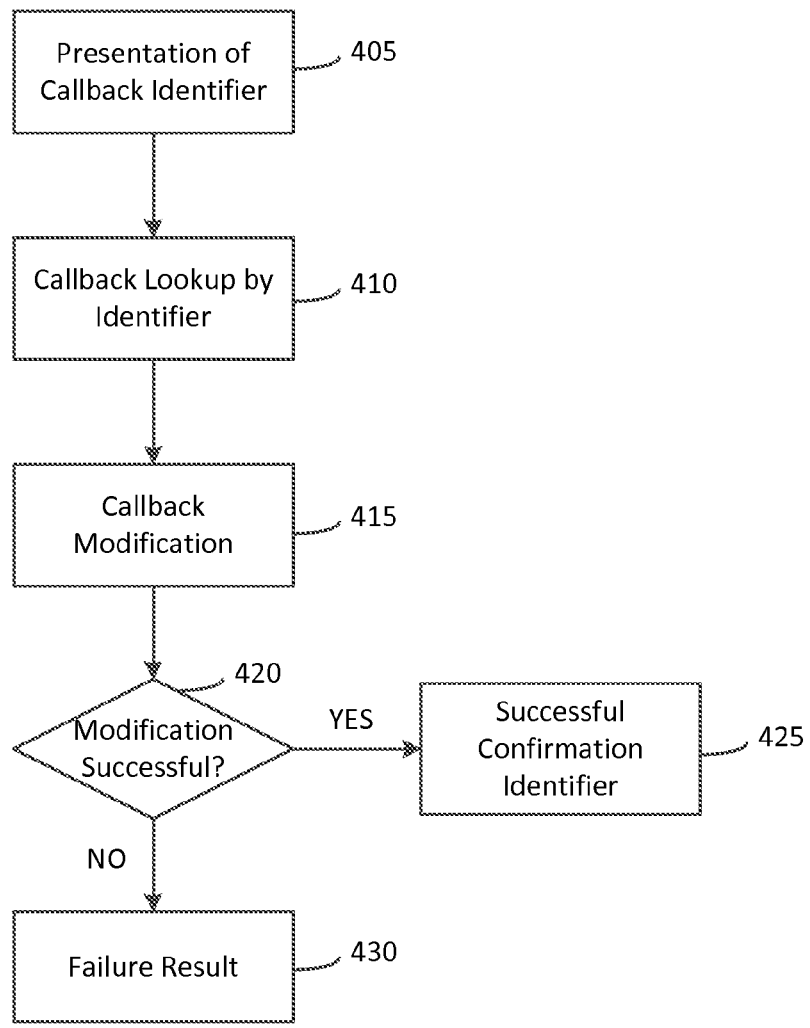
FIG. 4 is a flowchart illustrating one embodiment of a modified process for a customer service based callback.

FIG. 4 is a flowchart illustrating one embodiment of a modified process for a customer service based callback. The process 400 may be operative on any or all elements of the system 200 (FIG. 2).

In operation 405, a pending callback identifier is presented. For example, when an initial callback request is confirmed, a unique confirmation identifier may be issued. An identifier may be numerical or in another format. An identifier may also be a personal identification number (PIN) that would allow for easy entry in an interactive voice response system (IVR).

An IVR may rely on the PIN code alone to locate a unique pending callback request in the system, or it may use combined information such as the entered PIN and the caller's announced number identifier (ANI), or the equivalent ANI information could be manually entered by the caller. An IVR may have no PIN code and use only an ANI. In a smartphone application, for example, a unique identifier may be more complex and/or secure because it can be passed by the phone rather than a human. Tracking identifiers should also be unique in order to minimize the possibility of third party misuse. Control is passed to operation 410 and the process 400 continues.

In operation 410, callback lookup is performed according to an identifier. For example, the callback record associated with an existing callback request may be referenced in the system according to an identifier. A callback object may allow the system to enumerate the status of the pending request such as the current hold time, or place in queue. Details of the callback object may be read via an IVR, or passed to a mobile device or smartphone application. Control is passed to operation 415 and the process 400 continues.

In operation 415, callback modification occurs. For example, a user may decide to change aspects of the callback, including if and when the callback is to occur, what special agent skills may be required during a callback, and the preferred media the callback is to use. Callback modification may occur in real-time, such as during the waiting process. Modification may include time modification, skill modification, media modification, and address modification, to name a few. Examples of time modification may include pause/resume, delay, and move forward.

In at least one embodiment, a user may decide to pause a callback while unavailable, such as when attending a movie, for example. A user may also set the callback to delay for an amount of time, such as five minutes, for example, while placing a fast food order without being disturbed. Pausing a callback may remove the callback from further processing by rerouting the callback object into a non-routing wait queue. The callback object may wait to resume processing in this queue until the user requests, or a preset timeout occurs, and the object is deleted. Subsequent modification attempts to the deleted object may fail to find the object prompting the user to begin the callback process anew. To resume processing of the callback object, it may be transferred back into the active processing queue.

In at least one embodiment, delay of a callback object may occur until after a certain point in time. Delay may differ from pause due to the creation of a timer during the initial pause event to automatically trigger the resume event on behalf of the user. It may be desirable to include open/closed hours in the expected callback time response presented to the user as further described below.

In at least one embodiment, callbacks may be moved around in line. Objects may be routed in an automatic call distribution (ACD) system based on a variety of metrics including skill, priority, time on hold, desire to use, utilization, etc. The option to move a call forward may be used as a fee service to generate revenue by allowing a user to increase the priority of the callback and causing it to reach a customer service representative sooner.

In at least one embodiment, skill modification may occur in instances where requesting a callback requires more specific and unique skills that would result in a longer wait time than a callback requiring more broadly available skills. Callback objects may track the required skills used to match specific customer service representatives through ACD routing. The ability of the user to change the desired skills required of the callback request may lead to a reduction in hold times. Additionally, having the ability to modify the desired skills allows the user to more specifically target the proper customer service representative if new information becomes available while waiting for the callback.

In at least one embodiment, a user may initiate a callback for a specific media type or order preference of media types in an example such as that of a multimedia call center. In the case of media modification, for example, the user may wish to speak with a customer service representative by text messaging, but may also do so via a phone call if no agent is available to text chat. A customer service representative may be able to text chat with one or more users while on the phone with a user. A user may find it desirable to use text chat media in preference to a traditional voice call. While the original callback media preference may have been for a voice call, the user may observe wait times for text chats that are considerably less, therefore prompting a modification to the callback request to allow text chat as a media type. Media type modification would set a desire to use value for the media type where upon ACD processing, would route accordingly based on the new constraints.

In at least one embodiment, address modification may be performed. With address modification, for example, a callback that was originally requested to callback a mobile phone number may be changed to go to a different destination, such as a home telephone number. For a phone call or an SMS text message, the callback address may be a telephone number, while in the case of an e-mail callback, the address may be an SMTP e-mail address. Depending on the specific media type desired, various callback addresses may need to be utilized. Control is passed to operation 420 and the process 400 continues.

In operation 420, it is determined whether or not modification was successful. If it is determined that modification is successful, control is passed to operation 425 and the process ends. If it is determined that modification is not successful, control is passed to operation 430 and the process ends.

The determination in operation 420 may be made by whether or not a database was accessible, a record is unavailable, or an error is made as the user selects their modification, to name a few non-limiting examples.

In operation 425, a successful confirmation identifier is sent. For example, once a callback object has been successfully modified, confirmation of the new constraints may be communicated to the user. This may be in the form of a new callback identifier, or repeating the existing identifier as a reminder for the user. The confirmation details also include the final details of the callback to the user. In a mobile device application, for example, rich information may be communicated and updated in real-time. The confirmation may include information such as when the callback is expected to arrive. For example, if a user requested to delay a callback for an hour, it could cause the callback to be pushed to the next business day due to business hours of operation of the call center. This information helps the user to interactively make decisions as how to modify the callback to best suit their needs.

In operation 430, a failure result is sent. For example, a variety of failures may occur during the rescheduling of a callback. An example might be a call center which does not want to allow the scheduling of callbacks outside of the same business day. Ideally, an IVR, a Graphical User Interface, or a Telephony User Interface does not allow the selection of invalid modification options. When the system is unable to process the modification request, notification of that failure should be conveyed to the user. This information empowers the user to take the appropriate corrective action.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A computer-implemented method of self-service callback modification, in real-time, of a pending callback request from a previous interaction, the method comprising the steps of:
   a. presenting, by a caller, an identifier of said pending callback request from said previous interaction;
   b. performing, by a server, a callback lookup according to said identifier;
   c. modifying said pending callback request by said caller in real-time, wherein said caller selects from one or more options for modification; wherein said modification further comprises skill modification by said caller; wherein said skill modification further comprises changing a required skill for said pending callback request by said caller;
   d. routing, by said server, said pending callback request into an active processing queue according to said modifying;
   e. determining, by said server, if said modification of said pending callback request is successful, wherein a successful confirmation identifier is sent to said caller if said modification of said callback request is successful, and wherein a unsuccessful confirmation identifier is sent to said caller if said modification of said callback request is not successful;

wherein the modification of step (c) further comprises pausing said pending callback request;
      wherein the step of pausing said pending callback request further comprises the steps of:
         a. removing said pending callback request from further processing by rerouting said pending callback request into a non-routing wait queue; and
         b. resuming processing by transferring said pending callback request back into said active processing queue from said non-routing wait queue; wherein said resuming is triggered by a request from said caller to re-activate processing of said pending callback request.

2. The method of claim 1, wherein said modification of step (c) further comprises delaying said pending callback request, wherein said delaying of said pending callback request comprises creating a timer during said pause to resume said pending callback request.

3. The method of claim 1, wherein said modification of step (c) further comprises moving said pending callback request forward in said active processing queue.

4. The method of claim 3, wherein said step of moving said pending callback request forward in said active processing queue comprises utilizing a fee service to generate revenue by allowing for increased priority of said pending callback request.

5. The method of claim 1, wherein said modification of step (c) further comprises modification of a media preference used to perform said pending callback request.

6. The method of claim 5, wherein said step of said modification of said media preference further comprises changing a media type from an original media type to a new media type.

7. The method of claim 1, wherein said modification of step (c) further comprises modifying an address.

8. The method of claim 7, wherein said address modification further comprises changing a callback address to a new destination from an original address.

* * * * *